(12) United States Patent
Hori et al.

(10) Patent No.: US 8,000,205 B2
(45) Date of Patent: Aug. 16, 2011

(54) RECORDING APPARATUS AND RECORDING METHOD

(75) Inventors: Tatsuo Hori, Kanagawa (JP); Satoru Seko, Kanagawa (JP)

(73) Assignee: Sony Corporation, Tokyo (JP)

( * ) Notice: Subject to any disclaimer, the term of this patent is extended or adjusted under 35 U.S.C. 154(b) by 378 days.

(21) Appl. No.: 12/184,870

(22) Filed: Aug. 1, 2008

(65) Prior Publication Data

US 2009/0040581 A1 Feb. 12, 2009

(30) Foreign Application Priority Data

Aug. 10, 2007 (JP) .................................. 2007-209672

(51) Int. Cl.
 *G11B 7/00* (2006.01)
(52) U.S. Cl. ........................................ 369/103
(58) Field of Classification Search .................. 369/103
 See application file for complete search history.

(56) References Cited

U.S. PATENT DOCUMENTS

| | | | | |
|---|---|---|---|---|
| 5,566,387 A | * | 10/1996 | Dewald | 369/103 |
| 2006/0215528 A1 | * | 9/2006 | Hirao et al. | 369/103 |
| 2007/0147215 A1 | * | 6/2007 | Sakaguchi et al. | 369/103 |
| 2009/0262628 A1 | * | 10/2009 | Koda et al. | 369/103 |
| 2009/0303856 A1 | * | 12/2009 | Kadowaki et al. | 369/103 |

FOREIGN PATENT DOCUMENTS

| | | |
|---|---|---|
| JP | SHO 62-232767 | 10/1987 |
| JP | 2004-265472 | 9/2004 |
| JP | 2005-250038 | 9/2005 |
| JP | 2005-302189 | 10/2005 |
| JP | 2006-171416 | 6/2006 |
| JP | 2007-079438 | 3/2007 |
| WO | 2007/034656 A1 | 3/2007 |

OTHER PUBLICATIONS

Japanese Office Action issued Mar. 15, 2011, corresponding to Japanese Appln. No. 2007-209672.

* cited by examiner

*Primary Examiner* — Adam R Giesy
(74) *Attorney, Agent, or Firm* — K&L Gates LLP

(57) ABSTRACT

A recording apparatus for performing recording on a hologram recording medium includes a first light source configured to output first laser light having a first wavelength; a second light source configured to output second laser light having a second wavelength differing from the first wavelength; a recorder configured to perform data recording in units of hologram pages on the data recording layer of the hologram recording medium in such a manner that a recording data sequence is converted into a data pattern in units of hologram pages, the signal light is generated by performing space light modulation on the first laser light on the basis of the data pattern; a reflected light detector configured to irradiate the hologram recording medium with the second laser light; a position controller configured to perform position control; and a recording controller configured to perform control on the recorder.

9 Claims, 8 Drawing Sheets

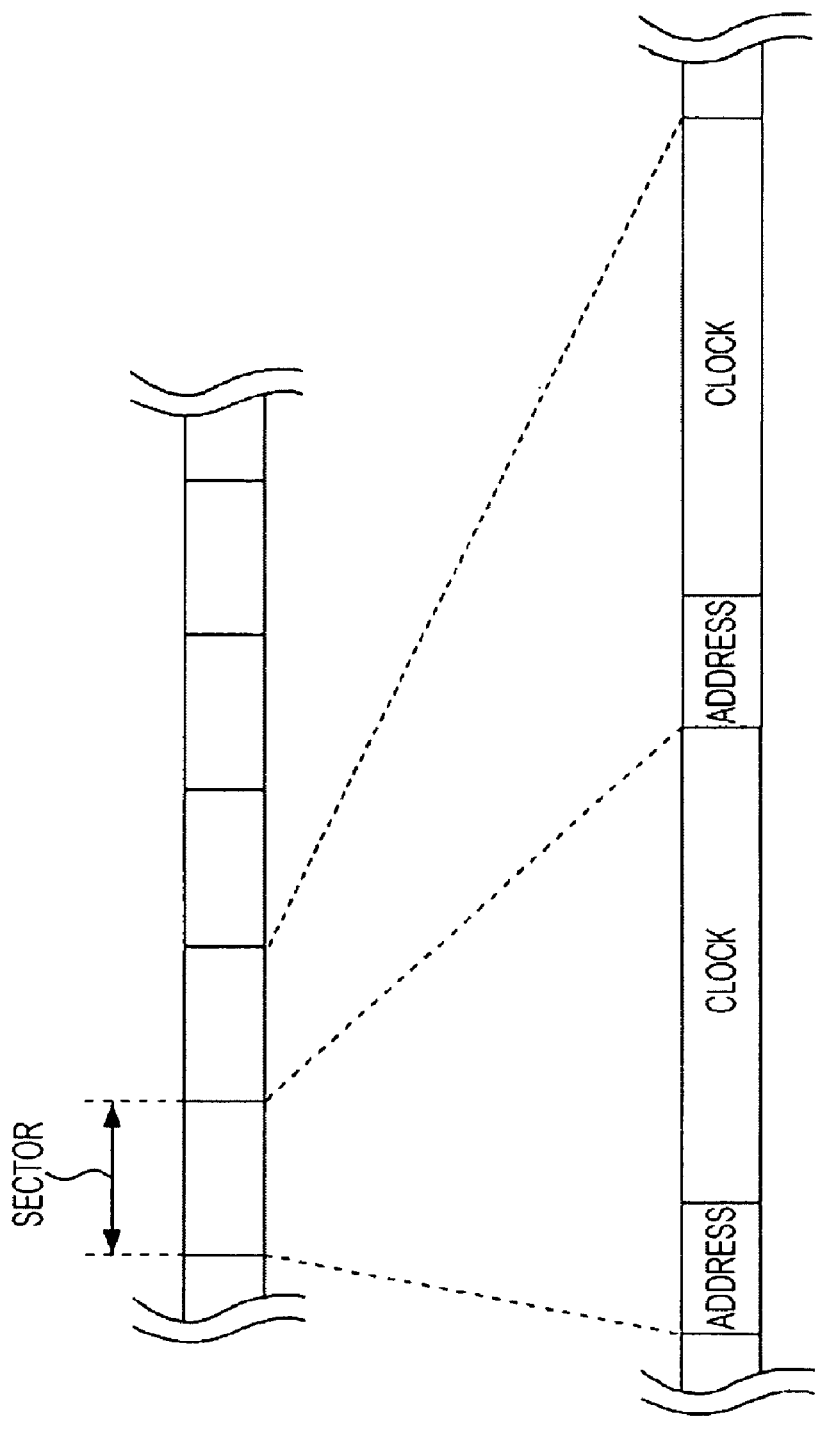

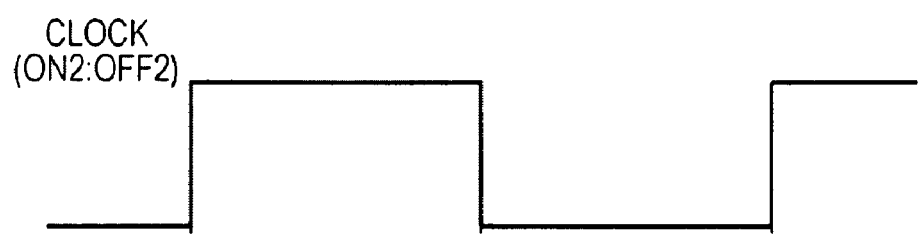
FIG. 5A CLOCK (ON2:OFF2)
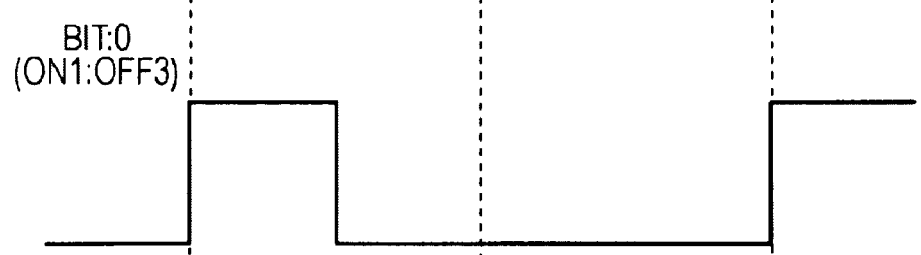
FIG. 5B BIT:0 (ON1:OFF3)
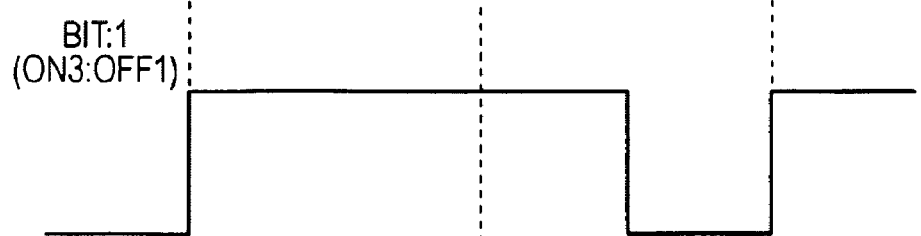
FIG. 5C BIT:1 (ON3:OFF1)

RECORDING APPARATUS AND RECORDING METHOD

CROSS REFERENCES TO RELATED APPLICATIONS

The present application claims priority to Japanese Patent Application JP 2007-209672 filed in the Japanese Patent Office on Aug. 10, 2007, the entire contents of which is incorporated herein by reference.

BACKGROUND

The present application relates to a recording apparatus for performing recording on a hologram recording medium on which data is recorded using a moire generated by interference between reference light and signal light and to a recording method for use with the recording apparatus.

For example, as disclosed in each of Japanese Unexamined Patent Application Publication Nos. 2005-250038 and 2007-79438, there is a known hologram recording and reproduction method for performing data recording using a moire generated by interference between signal light and reference light.

In this hologram recording and reproduction method, during recording, signal light that is subjected to space light modulation (for example, light intensity modulation) in accordance with recording data and reference light differing from the signal light are irradiated on a hologram recording medium, a moire generated thereby is formed on the hologram recording medium, and thus data recording is performed.

Furthermore, during reproduction, the reference light is irradiated on the hologram recording medium.

As a result of the reference light being irradiated in this manner, diffraction light in response to a moire formed on a hologram recording medium as described above is obtained. That is, as a result, reproduction light (reproduction signal light) in response to recorded data is obtained. The reproduction light obtained in the manner described above is detected using, for example, an image sensor, such as a CCD (Charge Coupled Device) sensor or a CMOS (Complementary Oxide Semiconductor) sensor and thus, recorded data is reproduced.

Here, as a hologram recording and reproduction method, similarly to a recording and reproduction technique for an optical disc of the related art, such as, for example, a CD (Compact Disc) or a DVD (Digital Versatile Disc), it is considered that data is recorded along tracks. That is, similarly to the case of an optical disc of the related art, by performing recording/reproduction position control, such as tracking servo control, data recording along tracks is performed.

Furthermore, in the hologram recording and reproduction method, the above-described interference between signal light and reference light causes an image (hologram page) containing information on a plurality of bits to be recorded at this time, recording is performed in such a manner that hologram pages are overlapped (multiplexed), and thus the recording density is increased. That is, regarding the recording material of the hologram recording medium, a monomer is changed to a polymer and thus, recording is performed. Since the density of such a change from a monomer to a polymer is coarse, it is possible to perform multiplexed recording of hologram pages at the same position until the monomer is used up.

FIG. 11 is a conceptual view of such hologram multiplexed recording.

First, in FIG. 11, the solid line indicates a track TR formed on a hologram recording medium. Recording of hologram pages is performed with the track TR being set as the center.

It is assumed in this case that the hologram recording medium has a disc shape, and the track TR is formed in a spiral shape on the hologram recording medium. That is, the track TR in this case is formed in such a manner that a plurality of tracks TR are arranged in the radial direction. Regarding the plurality of tracks TR in the radial direction, in FIG. 11, only three tracks TR1 to TR3 are selected and shown.

As shown in FIG. 11, in hologram multiplexed recording, when recording hologram pages along the tracks TR, each hologram page is recorded in such a manner as to be overlapped in the circumferential direction of the disc.

Furthermore, in hologram multiplexed recording, not only such multiplexing in the circumferential direction of the disc, but also multiplexing in the radial direction is performed. For example, in the case that the amount of recording data is comparatively large and the recording of hologram pages is continuously performed over a plurality of tracks TR, hologram pages recorded between tracks TR are overlapped. Hologram pages adjacent in the radial direction can be recorded in such a manner as to be overlapped as described above, and the interval (track pitch) between tracks TR is set shorter than the radius of the hologram page as shown in the figure. For example, according to the setting of the track pitch in the figure, the recording position in the radial direction of the hologram page on the adjacent track TR2 is a position indicated by the dashed-line circle with the track TR2 being serve as the center.

SUMMARY

As described above, in the hologram recording and reproduction method, it is presupposed that hologram pages are recorded in a multiplexed manner. When such multiplexed recording is to be performed, in order that a monomer remaining in a predetermined region containing recorded data is consumed after necessary recording is completed, it is necessary to perform a process called postcure.

This postcure will be described below with reference to FIG. 12.

FIG. 12 schematically shows a state in which hologram pages are recorded in a multiplexed manner on a necessary track TR1 on a medium, and a region in which additional recording is not possible due to postcure in that case.

Here, the change from a monomer to a polymer in a portion where the recording of a hologram page is performed proceeds in an ever-changing manner with respect to the region surrounding the recorded portion after recording. As a consequence, when a hologram page is to be additionally recorded later, there is a possibility that recording efficiency has been markedly decreased in the portion in the region surrounding the recorded portion. For this reason, a portion in the region surrounding the portion that has been recorded using a series of data recordings becomes a portion that should not be used during additional recording at a later time.

Furthermore, if a monomer remains in the portion where data has been recorded, for example, in the case that the monomer reacts when reference light is irradiated during reproduction, data destruction occurs. That is, it is difficult to correctly read recorded data.

As a result of the above, postcure is performed such that light as cure light is irradiated to a predetermined region of the recorded portion and the region surrounding the recorded portion, and the remaining monomer is consumed.

It is assumed in this case that when a hologram page is recorded on a certain track, the region in which the monomer reacts in response to the recording is a region indicated by an arrow I in the figure. That is, in this case, the region in which additional recording is not possible due to postcure in response to data recording on the track TR1 is the region surrounded by the short dashed line in the figure.

The reaction characteristics of the monomer of the recording material depend on the wavelength of irradiation light, and for the cure light, light having the same degree of wavelength as laser light for recording/reproduction is assumed to be irradiated.

As described above, since it is necessary to perform postcure in the hologram recording and reproduction method, not only the recorded portion, but also the portion in the region surrounding the recorded portion are made to be a state in which additional recording is not possible. Depending on the extent to which such an additional unrecordable portion is formed, the region in which it is difficult to perform multiplexed recording of hologram pages becomes large, in particular, in the radial direction, and a corresponding decrease in the recording density occurs.

Accordingly, in an embodiment, the recording apparatus is configured as described below.

According to an embodiment, there is provided a recording apparatus for performing recording on a hologram recording medium including, as a hologram recording medium on which data is recorded using a moire generated by interference between reference light and signal light, a data recording layer on which data is recorded using a moire, and a position information recording layer having formed thereon tracks in which at least address information for indicating a physical position on the data recording layer is recorded, a plurality of tracks on the position information recording layer being formed in such a manner as to be arranged in one plane direction of the hologram recording medium, the recording apparatus including: a first light source configured to output first laser light having a first wavelength; a second light source configured to output second laser light having a second wavelength differing from the first wavelength.

The recording apparatus also includes recording means for performing data recording in units of hologram pages on the data recording layer of the hologram recording medium in such a manner that a recording data sequence is converted into a data pattern in units of hologram pages, the signal light is generated by performing space light modulation on the first laser light on the basis of the data pattern, the reference light is generated on the basis of the first laser light, and the signal light and the reference light are irradiated to the hologram recording medium.

The recording apparatus also includes reflected light detection means for irradiating the hologram recording medium with the second laser light in such a manner that the light axis of the second laser light matches the light axis of the first laser light irradiated by the recording means and for detecting reflected light from the position information recording layer; and position control means for, on the basis of a reflected light signal obtained by reflected light detection by the reflected light detection means, performing position control so that a data recording position determined by the recording means is on the track.

The recording apparatus also includes recording control means for controlling the recording means in such a manner that a series of data to be recorded is recorded in a region that extends over a plurality of tracks arranged in the one plane direction and that is a portion in the direction in which the tracks are formed on the hologram recording medium.

According to an embodiments, whereas in the related art, a sequence of a series of recording data is continuously recorded along tracks, the recording data can be recorded separately among a plurality of tracks formed in the above-described region.

At this point, when a series of data is continuously recorded along tracks as in the optical disc recording technique of the related art, a portion in which additional recording is not possible due to postcure is formed comparatively long along tracks as shown in FIG. 12 above, and the region that is difficult to be used during later additional recording becomes large.

In comparison, if a series of data is recorded separately among a plurality of tracks as in the embodiments, the length in the direction (in the direction along tracks) in which tracks are formed in the recorded portion can be shortened correspondingly. As a result, the length in the track formation direction in the portion in which additional recording is not possible in consequence of postcure can also be shortened. That is, as a result, it is possible to shorten the region that is difficult to be used during later additional recording.

As described above, according to an embodiments, the region in which additional recording is not possible due to postcure after data recording can be shortened than in the case in which a technique of recording on an optical disc in the related art is used. This makes it possible to improve the data recording density.

Additional features and advantages are described herein, and will be apparent from the following Detailed Description and the figures.

BRIEF DESCRIPTION OF THE FIGURES

FIG. 4 shows an example of the data structure of data recorded using a bit sequence;

FIG. 5 shows an example in which clock information and address information are recorded;

DETAILED DESCRIPTION

The present application will be described below with reference to the figures according to an embodiment.

Configuration of Recording Apparatus and Hologram Recording Medium

Figure 1:
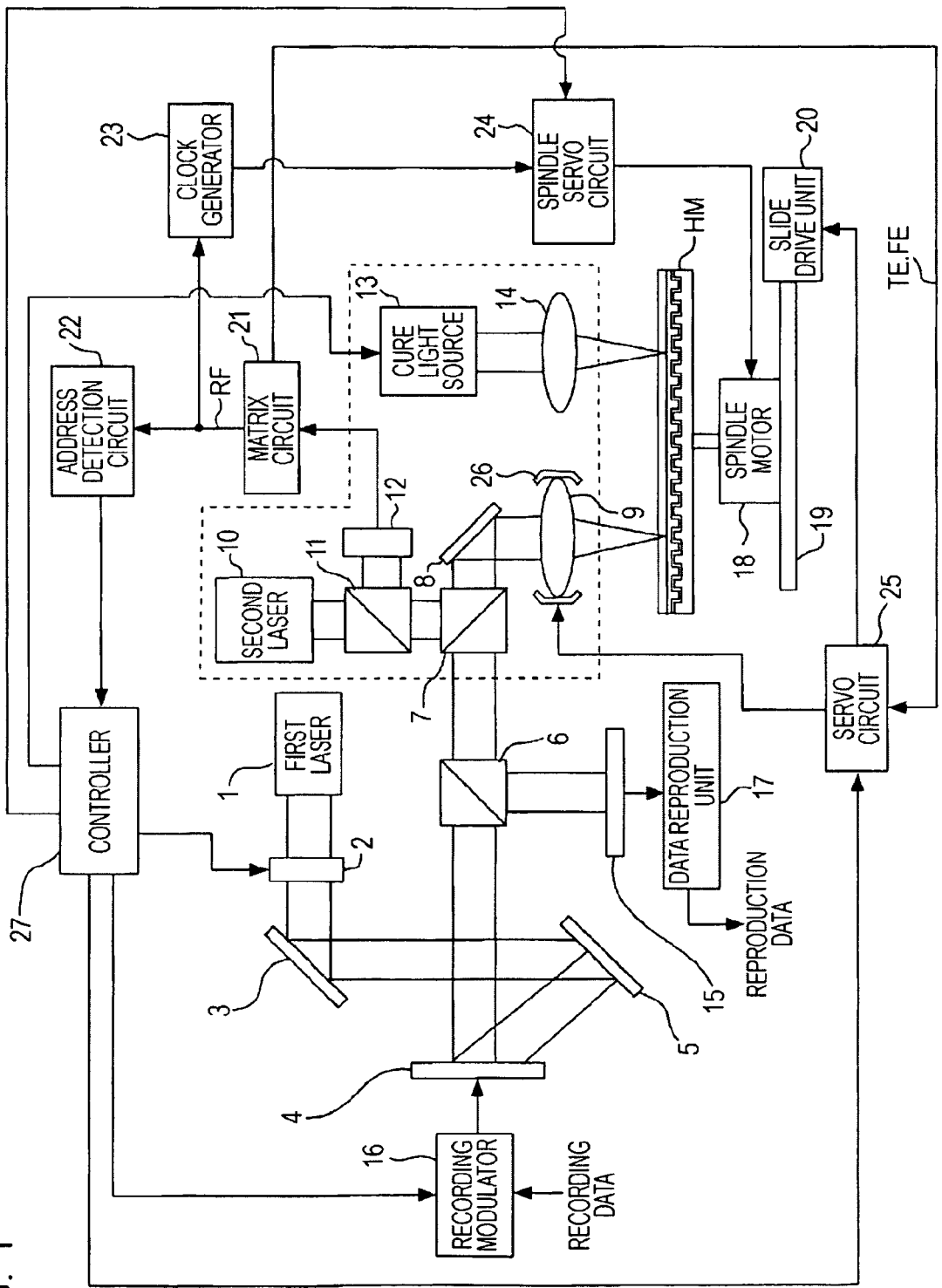
FIG. 1 is a block diagram showing the internal configuration of a recording apparatus according to an embodiment.

FIG. 1 is a block diagram showing the internal configuration of a recording apparatus according to an embodiment.

The recording apparatus of an embodiment has a function of recording on a hologram recording medium HM and also a function of reproducing therefrom. Based on this point, the recording apparatus according to an embodiment shown in FIG. 1 will be hereinafter referred to as a recording and reproduction apparatus.

First, in an embodiment, as a hologram recording and reproduction method, a so-called coaxial method is adopted. That is, signal light and reference light are arranged in the same axis, and both light is irradiated on a hologram recording medium HM set at a predetermined position in order to perform data recording using a moire. Also, during reproduction, reference light is irradiated on the hologram recording medium HM in order to reproduce data recorded using a moire.

In this case, the hologram recording medium HM is formed so as to have a disc shape, and the recording and reproduction apparatus shown in FIG. 1 causes the hologram recording medium HM to be rotationally driven so as to perform recording and reproduction of data.

Although described later in detail, on the hologram recording medium HM in this case, tracks are formed in a spiral shape from the inner region to the outer region. The recording and reproduction apparatus operates so as to record/reproduce data along tracks formed in this manner.

At this point, in a disc drive apparatus of the related art for performing recording on and reproduction from an optical disc, such as a CD (Compact Disc) and a DVD, when data is recorded along tracks formed on a recording medium in the manner described above, tracking servo is applied by using laser light for recording and reproduction.

That is, in the disc drive apparatus of the related art, recording/reproduction and various kinds of servo control are performed concurrently by irradiation of one type of laser light.

The reason why recording/reproduction and servo control can be performed by irradiation of only one type of laser light with regard to an optical disc of the related art in the manner described above is that a specific threshold value for recording power exists in the recording layer thereof.

However, in the case of a hologram recording medium, the situation differs from that of an optical disc of the related art. That is, as a recording material for the hologram recording medium, in the current situation, a photopolymer is most likely to be used. However, for a photopolymer, a specific threshold value regarding the recording power does not exist.

More specifically, change characteristics from a monomer to a polymer depends on the wavelength rather than the power of the irradiation light. Even if laser light irradiation using low power is performed as in an optical disc of the related art, a monomer is changed to a polymer, and the recording characteristics of that portion is worsened.

For this reason, in the hologram recording and reproduction method, when performing position control, such as tracking servo control, as in an optical disc of the related art, in order that reaction of polymer is prevented, another laser light having a wavelength different from that of laser light for recording and reproduction is used.

Figure 2:
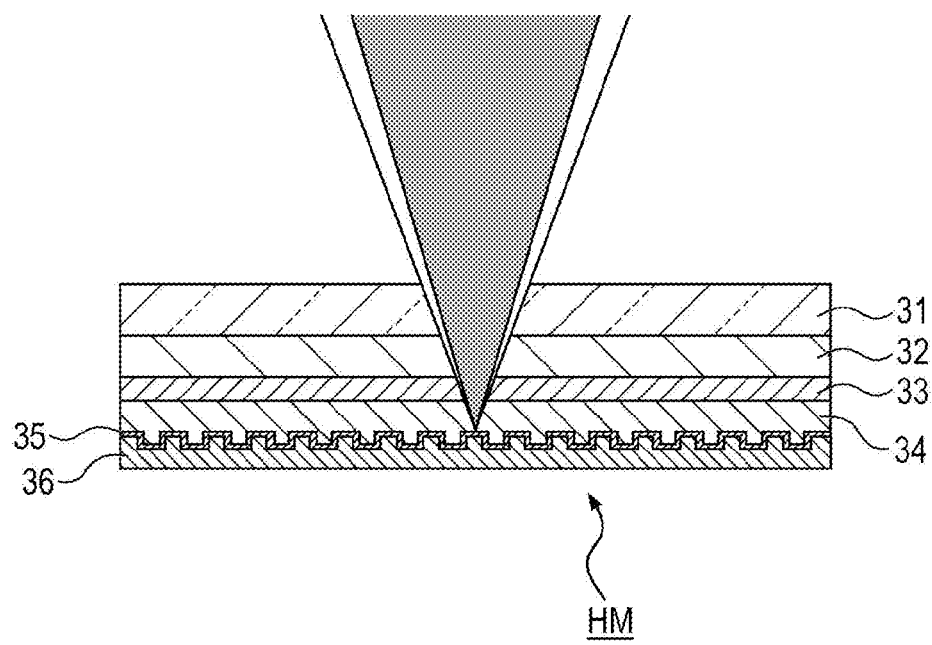
FIG. 2 shows the structure of the cross section of a hologram recording medium according to an embodiment.

FIG. 2 shows the structure of a hologram recording medium HM structured so as to be capable of coping with a case in which recording/reproduction position control is performed by irradiation of laser light having a wavelength different from that of laser light for recording and reproduction. FIG. 2 shows the structure of the cross section of the hologram recording medium HM.

As shown in the figure, on the hologram recording medium HM, a cover glass 31, a recording layer 32, and a reflection film 33 are formed in sequence from the top layer.

For the material of the recording layer 32, for example, a photopolymer described above is selected. In this case, recording/reproduction is performed using, for example, bluish-purple laser light having a wavelength=410 nm, in which a first laser 1 (to be described later) is a light source is performed. Furthermore, the reflection film 33 is provided so that, when reproduction light in response to data recorded on the recording layer 32 is obtained when reference light using bluish-purple laser light described above is irradiated during reproduction, this reproduction light is returned as reflected light to the apparatus side. The cover glass 31 is provided to protect the recording layer 32.

Then, the hologram recording medium HM is provided with a substrate 36 and a reflection film 35 in order to enable recording/reproduction position control. On the substrate 36, tracks TR are formed in a spiral shape from the inner region to the outer region of the hologram recording medium HM. In this case, tracks TR are formed as a result of information, such as address information by a pit sequence, being recorded, as will be described later.

On the surface on which the tracks TR are formed in the substrate 36, the reflection film 35 is formed by, for example, sputtering or vapor deposition.

For an intermediate layer 34 formed between the reflection film 35 and the reflection film 33, for example, a bonding material, such as a resin, is used.

Figure 3:
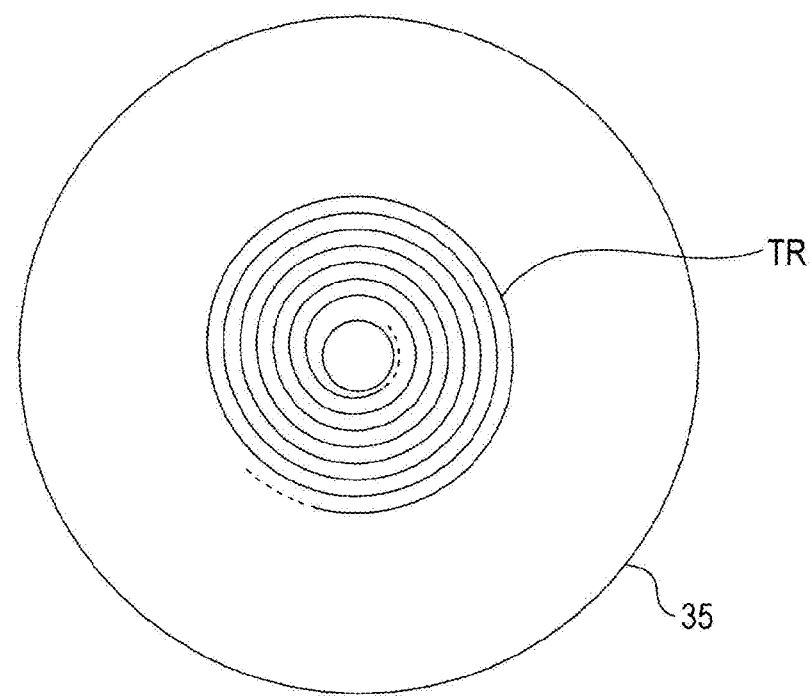
FIG. 3 shows an example in which tracks are formed on a hologram recording medium.

FIG. 3 schematically shows, as a view illustrating a track TR formed on a hologram recording medium HM, the cross section on the reflection film 35 side when the hologram recording medium HM is cut between the intermediate layer 34 and the reflection film 35.

As shown in FIG. 3, on the reflection film 35, a track TR is formed in a spiral shape from the inner region to the outer region in accordance with the surface shape of the substrate 36 in the lower layer thereof. By applying tracking servo to such a track TR, it is possible to perform recording/reproduction of a hologram page along the position at which the track TR is formed on the recording layer 32.

Also, in an embodiment, the interval (track pitch) at which the track TR is arranged in the radial direction is set shorter than at least the radius of the hologram page, so that multiplexed recording in the radial direction, which is described with reference to FIG. 11 above, can be performed.

Here, on the hologram recording medium HM, it is necessary for the reflection film 33 shown in FIG. 2 to have wavelength selectivity.

That is, in the case of a reflection-type hologram recording medium, in the manner described above, bluish-purple laser light for recording and reproduction should be reflected by the reflection film 33. Laser light separately irradiated for position control reaches the reflection film 35 on which the shape of a recessed/ projecting cross section in accordance with the formation of the pit sequence as the track TR is provided, and should be reflected by the reflection film 35. For this reason, the reflection film 33 is structured so as to have wavelength selectivity such that laser light for recording and reproduction is reflected and laser light irradiated for position control is passed therethrough.

In this case, laser light for position control is laser light in which a second laser 10 (to be described later) is a light source and is, for example, red laser light having a wavelength=660 nm in the same manner as for a DVD. Since the reflection film 33 is structured so as to have wavelength selectivity as described above, laser light for position control in this case is passed through the reflection film 33, reaches the reflection film 35 on the substrate 36, and is reflected thereby. This reflected light is guided as reflected light for position control to the apparatus side.

With reference to FIG. 4 below, the structure of data recorded by a pit sequence as the above-described track TR will be described below.

First, it is presupposed that, on the hologram recording medium HM in this case, sectors are defined as minimum units for data recording/reproduction in the recording layer 32, as shown in part (a) of FIG. 4. In this case, it is determined that each sector physically has the same section length and during recording, a predetermined number of hologram pages are recorded in a multiplexed manner for each sector.

Part (b) of FIG. 4 shows the data structure in a sector. As shown in part (b) of FIG. 4, the address information of the sector is recorded in a predetermined section at the beginning portion of the sector. Then, the remaining section following the recording section of the address information is filled with clock information.

FIG. 5 shows an example of the recording of address information and clock information recorded in each sector in the manner described above.

As shown in the figure, in this case, the clock information is recorded in such a manner that the ratio of an ON pulse length to an OFF pulse length is set at 2:2, that is, at the same ratio. In this case, the ON pulse is assumed to correspond to a land length, and the OFF pulse is assumed to correspond to a pit length.

Then, the address information is recorded in such a manner that the ratio of the ON pulse length to the OFF pulse length (=1:3) is set to "0" and the ratio of the ON pulse length to the OFF pulse length (=3:1) is set to "1".

As described above, the address information is recorded in such a manner that bits "0" and "1" are represented by the difference in the ratio of the ON pulse length to the OFF pulse length (the land length and the pit length). This makes it possible to detect the address information in this case without depending on the rotation direction of the hologram recording medium HM.

The description returns to FIG. 1.

In FIG. 1, the recording and reproduction apparatus is provided with a medium holder (not shown) for holding the hologram recording medium HM. When the hologram recording medium HM is loaded, the medium holder causes the hologram recording medium HM to be held in a rotationally driven manner using the spindle motor 18. In the recording and reproduction apparatus, recording/reproduction of a hologram page is performed by irradiating laser light in which the first laser 1 is a light source to the hologram recording medium HM that is rotationally driven in this manner.

For the first laser 1, for example, a laser diode with an external resonator is used, and the wavelength of the laser light is set at, for example, 410 nm. Hereafter, laser light in which the first laser 1 is a light source will be referred to as first laser light.

The first laser light emitted from the first laser 1 enters a shutter 2. The opening/closing of the shutter 2 is controlled by the controller 27 (to be described later), and incident light is cut/passed.

The first laser light passed through the shutter 2 is reflected by a mirror 3 as shown in the figure, and the reflected light is reflected again by a mirror 5 and enters an SLM (space light modulator) 4.

The SLM 4 performs, for example, space light intensity modulation as space light modulation for incident light. In this case, a reflection-type SLM 4 is used, and a space light modulator, such as, for example, a DMD (Digital Micromirror Device: registration trademark) or a reflection-type liquid-crystal panel, is used.

The SLM 4 causes each intensity modulation element to perform space light intensity modulation on incident light in units of pixels by changing the light intensity on the basis of a driving signal supplied from the recording modulator 16 shown in the figure.

The recording modulator 16 performs driving control on the SLM 4, so that signal light and reference light are generated during recording and only reference light is generated during reproduction.

More specifically, during recording, in the recording modulator 16 generates a driving signal for causing, for example, pixels in a predetermined region (signal light area) containing a central portion of the SLM 4 to have an on/off pattern in accordance with supplied recording data, for causing pixels in a predetermined region (referred to as a reference light area) on the outside of the peripheral region outer than the signal light area to have a preset predetermined on/off pattern, and for causing all the pixels other than the above pixels to be turned off, and supplies this driving signal to the SLM 4. As a result of space light intensity modulation being performed by the SLM 4 on the basis of the driving signal, the signal light and the reference light are generated.

Furthermore, during reproduction, the recording modulator 16 controls the driving of the SLM 4 on the basis of a driving signal for making pixels in the reference light area to have the predetermined on/off pattern and for turning off all the other pixels, thereby generating only the reference light.

During recording, the recording modulator 16 generates an on/off pattern within the signal light area in predetermined units of input recording data, thereby operates so that signal light in accordance with a pattern that differs in predetermined units of recording data is sequentially generated. As a result, data recording in units of a hologram page is performed on the hologram recording medium HM.

The light on which space light modulation has been performed by the SLM 4 is passed through a beam splitter 6, and thereafter enters a dichroic mirror 7.

The dichroic mirror 7 is configured to cause the first laser light to be passed therethrough and to cause second laser light (light in which the second laser 10 is a light source) to be reflected. For this reason, the first laser light passed through the beam splitter 6 passes through the dichroic mirror 7, is reflected by the mirror 8 as shown in the figure, and thereafter is irradiated to the hologram recording medium HM via an objective lens 9 held by the two-axis mechanism 26.

The two-axis mechanism 26 displaceably holds the objective lens 9 in a direction (focus direction) in which the objective lens 9 contacts or separates from the hologram recording medium HM and in the direction of the radius of the hologram recording medium HM (direction intersecting at right angles to the focus direction: tracking direction). Furthermore, the two-axis mechanism 26 is provided with a focus coil for driving the objective lens 9 in the focus direction and a tracking coil for driving it in the tracking direction.

Here, the first laser light passed through the SLM 4 in the manner described above is irradiated to the hologram recording medium HM via the objective lens 9. Depending on the above-described space light modulation during recording by the SLM 4, signal light and reference light based on the first laser light are generated. Therefore, during recording, the signal light and the reference light are irradiated to the hologram recording medium HM. As a result of the signal light and the reference light being irradiated to the hologram recording medium HM in this manner, it is possible to record, on the recording layer 32, data on the basis of a moire generated by interference between these lights.

Furthermore, during reproduction, only the reference light is generated by the SLM 4, and this light is irradiated to the hologram recording medium HM through the above-described light path. In response to the reference light being irradiated to the hologram recording medium HM in this manner, diffraction light (reproduction light) in response to a moire is obtained. The reproduction light obtained as described above returns as reflected light from the reflection film 33 of the hologram recording medium HM to the apparatus side.

After the reproduction light is formed as parallel light via the objective lens 9, the reproduction light is reflected by the mirror 8, and enters the beam splitter 6 after passing through the dichroic mirror 7.

In the beam splitter 6, the entered reproduction light is reflected. The light reflected by the beam splitter 6 enters an image sensor 15 as shown in the figure.

The image sensor 15 is formed of, for example, a CCD (Charge Coupled Device) sensor or a CMOS (Complementary Metal Oxide Semiconductor) sensor, photoreceives, from the hologram recording medium HM, reproduction light guided in the manner described above, and converts this light into an electrical signal in order to obtain an image signal. The image signal obtained in the manner described above reflects a data pattern of "0"/"1" supplied to the signal light during recording (that is, an ON/OFF pattern of light). That is, the image signal detected by the image sensor 15 in the manner described above corresponds to a read signal of data recorded on the hologram recording medium HM.

A data reproduction unit 17 performs data identification of "0"/"1" for each value of the pixel unit of the SLM 4, which is contained in the image signal detected by the image sensor 15, and reproduces data recorded on the hologram recording medium HM.

In the recording and reproduction apparatus shown in FIG. 1, an optical system for controlling a recording/reproduction position of a recording/reproduction operation performed using the first laser light as described above is provided. More specifically, a second laser 10, a beam splitter 11, and a photodetector 12 are provided.

The second laser 10 is configured to irradiate laser light having a wavelength different from that of the first laser light. More specifically, in this case, laser light having, for example, a wavelength of 660 nm, which is assumed to have practically no sensitivity for the recording layer 32 of the hologram recording medium HM, is output.

After the laser light (second laser light) emitted from the second laser 10 passes through the beam splitter 11, the laser light is reflected by the dichroic mirror 7, and is guided to the mirror 8 side. The second laser light guided to the mirror 8 side is also irradiated to the hologram recording medium HM through the same path as for the first laser light. As can be understood from the above, the dichroic mirror 7 has a function of irradiating the laser light to the hologram recording medium HM in such a manner that the optical axes of the first laser light and the second laser light match each other.

As described with reference to FIG. 2 above, on the hologram recording medium HM, the second laser light having a wavelength of 660 nm irradiated in this manner passes through the reflection film 33 and is reflected by the reflection film 35 of the lower layer. That is, as a result, the reflected light that reflects the shape of the recessed/projecting cross section on the reflection film 35 in accordance with the track TR formed on the substrate 36 is obtained.

Similarly to the case of the first laser light, the reflected light from the reflection film 35 enters the dichroic mirror 7 through the objective lens 9 and the mirror 8.

In the dichroic mirror 7, the reflected light from the hologram recording medium HM with regard to such second laser light is reflected, and this reflected light is guided to the beam splitter 11 side. In the beam splitter 11, the reflected light from the hologram recording medium HM is reflected and is guided to the photodetector 12 side.

The photodetector 12 includes a plurality of photoreceiving elements, photoreceives the reflected light from the hologram recording medium HM, which is guided in the manner described above, converts the reflected light into an electrical signal, and supplies the signal to a matrix circuit 21.

The matrix circuit 21 includes a matrix computation/amplification circuit and the like for an output signal from the plurality of photoreceiving elements as the photodetectors 12 and generates a necessary signal by a matrix computation process.

for example, a signal (reproduction signal RF) corresponding to a reproduction signal for a pit sequence formed on the hologram recording medium HM, a focus error signal FE, a tracking error signal TE, and the like for servo control are generated.

The reproduction signal RF output from the matrix circuit 21 is supplied to an address detection circuit 22 and a clock generator 23. Furthermore, the focus error signal FE and the tracking error signal TE are supplied to a servo circuit 25.

The clock generator 23 performs a PLL process on the basis of the reproduction signal RF and generates a reproduction clock. This reproduction clock signal is supplied to a spindle servo circuit 24. Although not shown in the figure, the reproduction clock is also supplied as a necessary operation clock for each unit.

the spindle servo circuit 24 performs the rotation control of the spindle motor 18.

the spindle servo circuit 24 obtains the reproduction clock as the current rotational speed information on the spindle motor 18, and compares this information with predetermined reference speed information, thereby generating a spindle error signal.

then, on the basis of the spindle drive signal generated in response to a spindle error signal, the spindle servo circuit 24 performs the rotation control of the spindle motor 18.

Furthermore, the spindle servo circuit 24 causes a spindle drive signal based on instructions from the controller 27 to be generated, and performs control of start-up, stop, acceleration, deceleration, and rotation direction of the spindle motor 18.

The address detection circuit 22 detects the address information on the basis of the reproduction signal RF. In this case, the address information has been recorded by the difference in the ratio of the land length to the pit length, as described with reference to FIG. 4 above. For this reason, the address detection circuit 22 performs, as an address detection operation, an operation for obtaining address information on the basis of the result in which the ratio of the ON pulse length to the OFF pulse length in the reproduction signal RF is detected.

The address information detected by the address detection circuit 22 is supplied to the controller 27.

On the basis of the focus error signal FE and the tracking error signal TE from the matrix circuit 21, the servo circuit 25 generates various kinds of servo signals for focus, tracking, and sled in order to perform a servo operation.

That is, a focus servo signal and a tracking servo signal are generated on the basis of the focus error signal FE and the tracking error signal TE, respectively, and these signals are supplied as drive signals (a focus drive signal and a tracking drive signal) for the two-axis mechanism 26, so that the driving of the focus coil and the tracking coil of the two-axis mechanism 26 is controlled on the basis of the corresponding drive signals in accordance with the servo signals. As a result, a tracking servo loop and a focus servo loop by the photodetector 12, the matrix circuit 21, the servo circuit 25, and the two-axis mechanism 26 are formed.

Furthermore, the servo circuit 25 turns off the tracking servo loop on the basis of a track jump command from the controller 27, and outputs a jump pulse as the tracking drive signal, so that a track jump operation is performed.

Furthermore, on the basis of the a sled error signal obtained as lower frequency components of the tracking error signal TE and on the basis of seek operation control from the controller 27, the servo circuit 25 causes a slide driving unit 20 shown in the figure to make a slide mechanism 19 be driven to slide.

The slide mechanism 19 holds the spindle motor 18 described above in such a manner as to be slidable in the tracking direction (the radial direction of the hologram recording medium HM). That is, by providing such a slide mechanism 19, the hologram recording medium HM that is rotationally driven by the spindle motor 18 can be displaced in the tracking direction.

The slide driving unit 20 includes a motor for driving the slide mechanism 19, and the slide mechanism 19 is configured to cause the spindle motor 18 to slide on the basis of the driving force from the motor.

various kinds of the above-described operations of the servo system and the reproduction system are controlled by the controller 27 formed by, for example, a microcomputer.

The controller 27 controls the entire recording and reproduction apparatus.

For example, when data recorded on the hologram recording medium HM is to be reproduced, first, a target address is specified and seek operation control is performed.

That is, a target address is indicated to the servo circuit 25, so that an access operation in which the address is a target is performed. Here, according to the description provided earlier, when reproducing data (hologram page data) recorded on the hologram recording medium HM, reference light based on the first laser light needs to be irradiated. For this reason, during reproduction, in conjunction with the seek operation control, the recording modulator 16 performs the driving control operation described earlier for the SLM 4, which corresponds to the reproduction time, so that reference light is generated in the SLM 4.

Furthermore, for example, when data is to be recorded at a certain position on the hologram recording medium HM, a target address is indicated to the servo circuit 25 so that an access operation to the target address is performed and also, instructions are issued to the recording modulator 16 so that the driving control of the SLM 4 in response to the recording data is started.

Figure 11:
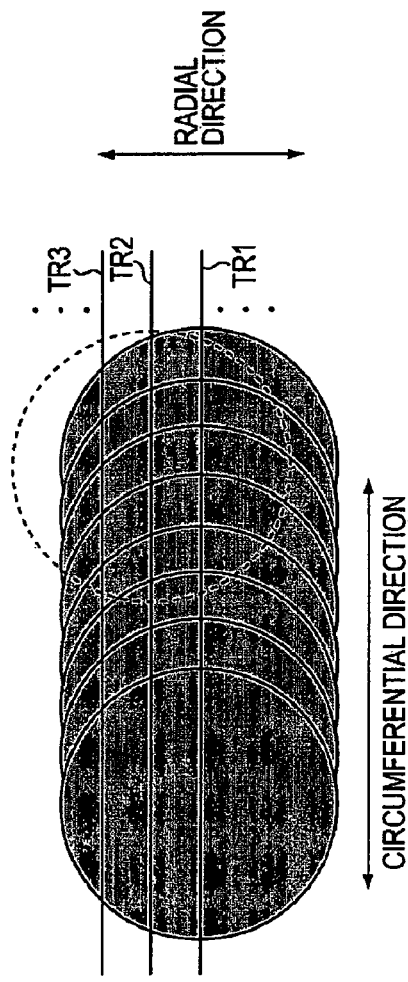
FIG. 11 is a conceptual view of hologram multiplexed recording.

Furthermore, during recording, opening/closing control of the shutter 2 is performed so that multiplexed recording of hologram pages as shown in FIG. 11 above is enabled.

Furthermore, the controller 27 performs a so-called cure process by turning on the cure light source 13 shown in the figure and by irradiating cure light to the hologram recording medium HM.

For the cure light source 13, for example, an LED (Light Emitting Diode) is used, and the cure light source 13 is configured to be capable of outputting, as the cure light, light having a wavelength having sensitivity for a recording material formed on the recording layer 32. For example, in this case, the cure light source 13 is configured to output light (ultraviolet light) having a wavelength approximately the same as that of the first laser light. The light emitted from the cure light source 13 as shown in the figure passes through a collective lens 14 and is irradiated to the hologram recording medium HM.

A cure process using such a cure light source 13 will be described later.

Recording Operation

Figure 6:
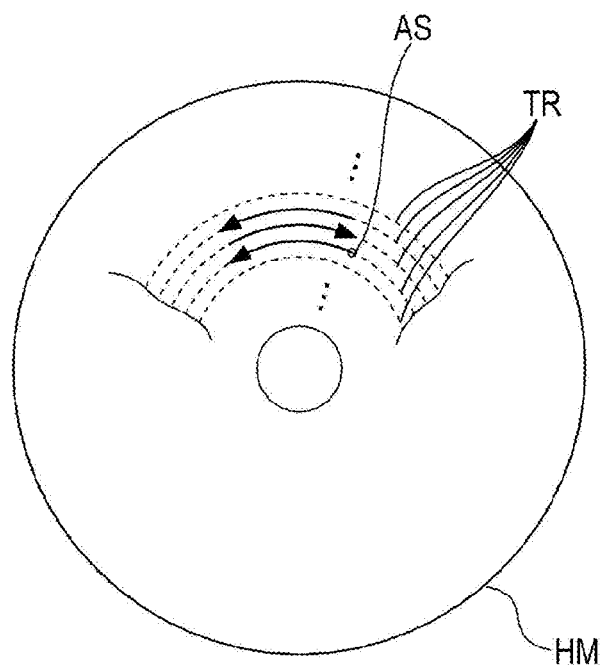
FIG. 6 illustrates a recording operation according to an embodiment.

FIG. 6 illustrates a recording operation in an embodiment.

In FIG. 6, tracks TR formed on the hologram recording medium HM are indicated by the dashed line, and a data recording region is indicated by the solid line on the tracks TR.

It is assumed in an embodiment that a series of data to be recorded is recorded in a region that extends over a plurality of tracks TR arranged in the radial direction on the hologram recording medium HM and that is a portion in the direction in which the tracks TR are formed (in this case, in the circumferential direction). That is, recording of a series of data is performed in a region in which a plurality of tracks TR arranged in the radial direction as shown in the figure are contained and that is a portion that does not extend over one circulation of the track TR in the direction in which the tracks TR are formed.

Furthermore, in this case, when setting the recording target region, a condition is further added, so that the length of the data recording section on each track TR used becomes equal. As a result of the above, the amounts of data recorded on each track TR can be made the same, and thus data management becomes easy.

Here, as described with reference to FIG. 4 above, a predetermined number of hologram pages are recorded for each sector on the hologram recording medium HM. Therefore, if information on the amount of data to be recorded is known, it is possible to set the region that satisfies each of the above-described conditions when recording is assumed to be started from a necessary recording start position As.

More specifically, in this case, since data recording section lengths are equalized among tracks TR, the number of tracks TR used for recording is determined by dividing the amount of data of a series of data to be recorded with a predetermined value. Then, the recording start/end address of each track TR when recording data is assigned sequentially from the recording start position As is determined. At this time, the recording start address/recording end address of each track TR is set in such a manner that data recording sections on each track TR overlap. As a result, the above-described "region that extends over a plurality of tracks TR arranged in the radial direction and that is a portion in the direction in which the tracks TR are formed" can be set.

The data recording in this case is performed sequentially from the tracks TR in the inner region to the tracks TR in the outer region.

Furthermore, in an embodiment, when a series of data is to be recorded in a divided manner among a plurality of tracks TR, the recording direction is made to differ between adjacent tracks TR. The arrow in the figure indicates the recording direction on each track TR in the recording target region in this case.

If the recording direction is made to differ between adjacent tracks TR in this manner, when the continuation of the data is to be recorded on the next subsequent adjacent track TR, there is no need to record again from the position returned in a direction reverse to the recording direction, and thus the amount of movement when performing recording on the next track TR can be minimized. Then, as a result of the above, the time taken to perform recording in the recording target region can be shortened correspondingly, with the result that the recording operation can be quickened.

A description will be given for confirmation purposes. As described earlier, address information is recorded by the difference in the ratio of the land length to the pit length, and the address detection circuit 22 performs an address detection operation supporting this recording. As a consequence, it is possible to appropriately detect the address information when the recording direction is either forward or reverse. That is, as a result of the above, regardless of whether the recording direction is forward or reverse, it is possible to appropriately detect the recording start address and the recording end address on each track TR. This makes it possible to correctly perform recording in the recording target region.

At this point, for the sake of description in the above, the data recording technique as an embodiment has been described earlier. In practice, when performing data recording on the hologram recording medium HM, a process called precure is performed in advance in a region in which data is recorded.

This precure is performed to improve recording efficiency by activating a recording material in advance by considering the property of the recording material of the hologram recording medium HM used at the present situation. This precure has also been disclosed in Japanese Unexamined Patent Application Publication No. 2005-250038 described above.

When performing this precure, the controller 27 shown in FIG. 1 performs control so that, after the recording target region for a series of data to be recorded is determined by calculations as described above, irradiation of cure light is performed by the cure light source 13 by targeting the recording target region on the hologram recording medium HM.

Note that the collective lens 14 for irradiating cure light from the cure light source 13 is arranged at a position differing from that of the objective lens 9 for irradiating the second laser light for the purpose of performing address detection. That is, when performing a cure process, if seek operation control using, as it is, the information on the recording target region, which is calculated as described above is performed, it is not possible to correctly perform precure in the recording target region of the hologram recording medium HM.

In this case, the position of the collective lens 14 is fixed and therefore, it is possible for the controller 27 to know the relationship of the relative position with the objective lens 9. That is, on the basis of the above, it is possible to know the clearance between the spot position of the laser light irradiated via the objective lens 9 and the spot of the cure light irradiated via the collective lens 14.

When performing precuring, seek operation control on the servo circuit 25 is performed with the value of the address being shifted by an amount corresponding to the clearance.

As a result, it is possible to correctly perform precure in which the recording target region is a target.

Furthermore, as a cure process, postcure targeting the recording target region in which data has already been recorded and a predetermined region containing the region surrounding the recorded data is performed after data recording is performed. As described earlier, this postcure is performed to prevent data destruction due to irradiation of reference light during reproduction with respect to a recorded portion and to prevent multiplexed recording for the surrounding portion of the recorded portion (because recording characteristics of the portion surrounding the recorded portion have been worsened).

As this postcure, irradiation of cure light targeting a predetermined region is performed. Therefore, the operation of the controller 27 is the same as in the case of precure described earlier except that the address value indicated to the servo circuit 25 differs.

Figure 7:
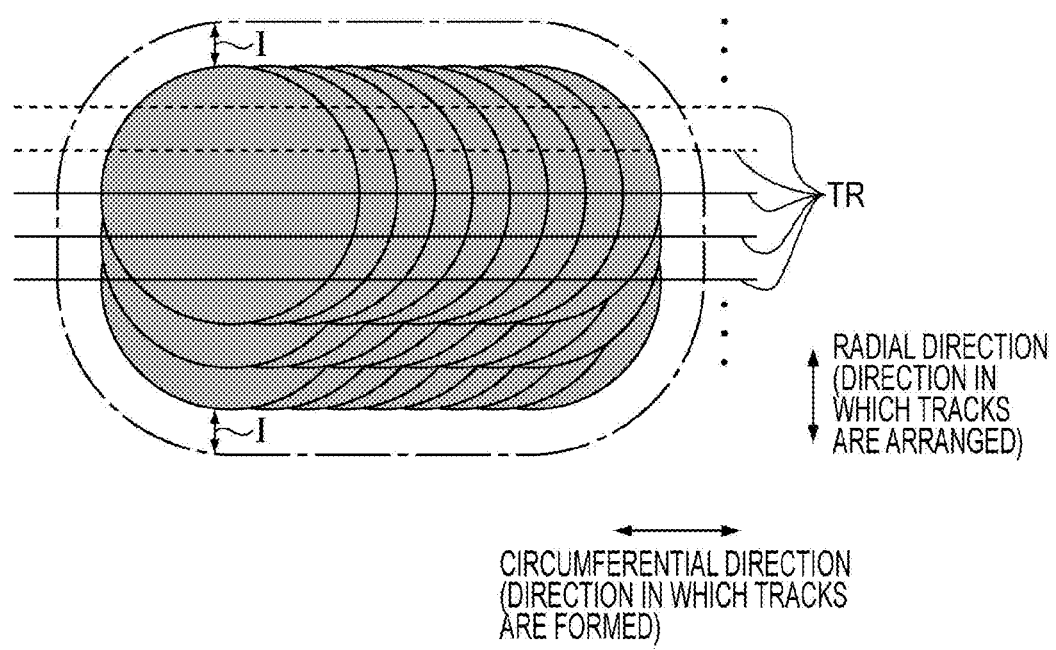
FIG. 7 schematically shows a region in which additional recording should be not possible due to postcure when a recording operation according to an embodiment is performed.

FIG. 7 illustrates a region in which additional recording should be not possible due to the postcure when data recording as an embodiment is performed described with reference to FIG. 6.

According to the description with reference to FIG. 6 above, a series of data to be recorded is recorded in such a manner as to be divided among three tracks TR shown in FIG. 7, so that recording sections of tracks TR overlap. At this time, the lengths of the data recording sections are equalized on each track TR.

In FIG. 7, the tracks TR indicated by the solid line represent tracks TR in which a hologram page has been recorded.

If it is assumed here that the region in which a monomer reacts to a portion where data recording has been performed is the same as a reaction region I of a monomer described with reference to FIG. 12 above, the region in which additional recording should be not possible due to postcure in this case is a region surrounded by the short dashed line in the figure. That is, the region in which postcure should be performed needs only be a region in which at least the reaction region I of the monomer is added to the recording target region of the series of data.

However, in practice, it is difficult to strictly define the reaction region I of the monomer. Therefore, for the region in which postcure is performed, a comparatively wide region capable of sufficiently covering the reaction region I of the monomer is set.

For example, in this case, for the region of the peripheral portion to be added to the recording target region, a predetermined extra region is assumed to be determined in advance: for example, with regard to the radial direction, the region is set to be a region up to several tracks from each of the tracks TR at both ends in the recording target region, and with regard to the circumferential direction, the region is set to be a region for several addresses from the recording start address/recording end address of each track TR in the recording target region. That is, by adding a preset predetermined extra region to the recording target region, the region in which postcure is performed is set.

In the manner described above, postcure is performed in the region containing a data recorded portion and a predetermined portion surrounding the data recorded portion. The region in which postcure has been performed is a region in which a monomer has been consumed and is a region that is difficult to be used during data additional recording at a later time.

Figure 12:
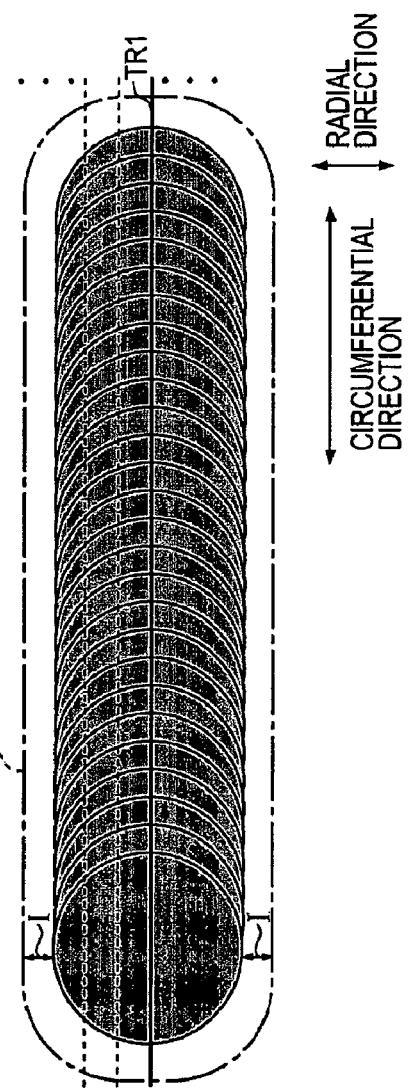
FIG. 12 illustrates postcure.

However, when the region shown in FIG. 7, in which postcure should be performed, is compared with the region in which postcure should be performed when recording based on the technique of the related art shown in FIG. 12 above is performed, the area thereof in the case of FIG. 7 is more reduced. FIG. 7 shows, for the purpose of description, a case in which the same number of hologram pages as in the case of FIG. 12 above are recorded. At this time, when recording is performed in such a manner as to be divided among, for example, three tracks TR, the length in the circumferential direction of the region in which additional recording should be not possible due to postcure can be made to be ⅓ that of the case of FIG. 12. As can be understood from the above, according to the recording technique of an embodiment, the area of the portion in which additional recording is not possible can be reduced more than in the case of the technique of the related art shown in FIG. 12.

If the portion in which additional recording is not possible can be reduced as described above, it is possible to efficiently use the limited recording area on the hologram medium HM and to improve the recording density.

As can be understood from the above description, when reducing the area of the region in which additional recording should be not possible due to postcure, a series of data to be recorded may be recorded on a plurality of consecutive tracks TR arranged in the radial direction in a divided manner in such a manner that data recording sections on each track TR overlap. Then, when the recording target region is set to satisfy this condition, the region is a "region that extends over a plurality of tracks TR arranged in the radial direction and that is a portion in the direction in which the tracks TR are formed" described earlier.

Furthermore, it is assumed in an embodiment that, in order that a series of data recorded in such a manner as to be divided among a plurality of tracks TR as described above can be reproduced, recording region management information indicating the correspondence between a series of recorded data and the region in which this data has been recorded is recorded on the hologram recording medium HM.

That is, the controller 27 generates recording region management information indicating the correspondence between the recorded data and the recording region thereof each time recording of a series of data is performed, and records the recording region management information in a predetermined management information recording area, such as, for example, the innermost peripheral region of the hologram recording medium HM.

As a result of the recording region management information being recorded on the hologram recording medium HM in the manner described above, when reproducing the hologram recording medium HM, it is possible to obtain the information on the region in which a series of data to be reproduced has been recorded on the basis of the result in which the recording region management information recorded in the management information recording area is read.

In an embodiment, the recording direction is made to differ between adjacent tracks TR. According to this, the recording region management information may be further associated with information on the recording direction for each track TR in the recording region.

However, when the recording direction for each track TR is determined in advance, such as, for example, the forward direction for odd-numbered tracks and the reverse direction for even-numbered tracks, it is not necessary to make the recording region management information be associated with information on the recording direction for each track TR.

It is also assumed in an embodiment that, for example, the recording direction in each track TR is determined in advance in this manner. Therefore, it is assumed that the correspondence of the recording direction for each track TR in the management information is not made.

Processing Operation

Next, a description will be given, with reference to the flowchart in FIG. 8, of a processing operation to be performed to implement a recording operation as the above-described embodiment.

Figure 8:
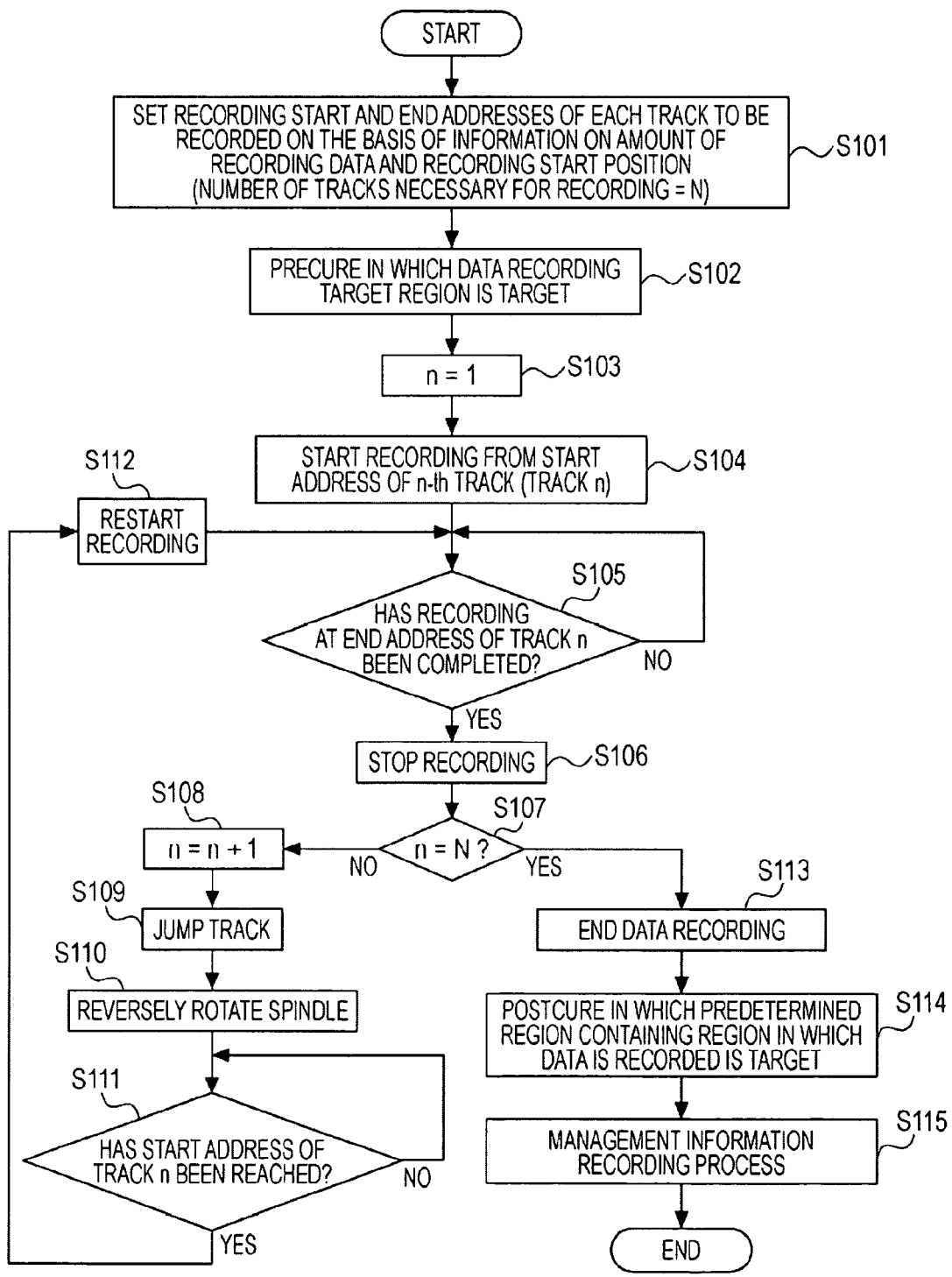
FIG. 8 is a flowchart showing a processing operation for implementing a recording operation according to an embodiment.

The processing operation shown in FIG. 8 is performed by the controller 27 shown in FIG. 1 in accordance with, for example, a program stored in a built-in memory.

Referring to FIG. 8, initially, in step S101, the recording start/end address of each track to be recorded is set on the basis of the information on the amount of recording data and the recording start position. That is, for setting the recording target region that satisfies the condition described earlier (a plurality of consecutive tracks TR arranged in the radial direction are used, the lengths of the data recording sections in each track TR are equal, and the data recording sections overlap in the radial direction among tracks TR), the recording start address and the recording end address of each track TR are calculated on the basis of the information on the amount of the series of data to be recorded and the recording start position As, and are set.

As described earlier, in this case, for the odd-numbered tracks, the recording direction has been set in advance so as to differ between adjacent tracks TR, such as the direction is a forward direction, and for the even-numbered tracks, the direction is a reverse direction. As a consequence, the recording start address and the recording end address of each track TR are set so as to reflect the information on the recording direction for each track TR that is preset in this manner.

As a result of the process of step S101 being performed, the number of tracks TR necessary for recording is known. The number of tracks TR necessary for recording in this manner is set to N.

In the subsequent step S102, a process for performing precure targeting the data recording target region is performed. That is, the irradiation region of cure light is set by shifting the values of the recording start address and the recording end address for each track TR, which are set in step S101, by an amount corresponding to the clearance between the spot position of laser light irradiated via the objective lens 9 and the spot of cure light irradiated via the collective lens 14. Then, while seek operation control for each track TR is sequentially performed on the servo circuit 25 on the basis of the information on the irradiation region, ON/OFF control of the cure light source 13 is performed so that cure light is irradiated between the start address and the end address of each track TR.

The irradiation sequence of the cure light is not particularly limited. In this case, as an example, similarly to the data recording technique performed in the following, cure light is assumed to be scanned for each track TR. In this case, if the irradiation direction is made to differ between tracks TR with regard to the irradiation of cure light, it is possible to shorten the time taken for a cure process. In that case, instructions may be issued to the spindle servo circuit 24 so that the rotation direction of the spindle motor 18 differs for each track TR.

Here, as in the case of this example, when the track pitch is set to be shorter than the radius of the hologram page under the assumption of multiplexed recording, the scan region of cure light becomes duplicated.

The irradiation region of cure light need not be multiplexed unlike the case in which hologram pages are recorded. When this multiplexed recording is to be avoided, it is possible to adopt measures, such as the scan interval in the radial direction of cure light is provided for a plurality of tracks. As a result of the above, it is possible to further shorten the time taken for a cure process. This also applies to postcuring.

In step S103, it is set that n=1. As can be understood from the following description, the numeric value of n is a value indicating the sequence position in which the data in the track TR among the tracks TR should be recorded in the recording target region.

In the subsequent step S104, recording from the start address of the n-th track (set as a track n) is started. That is, the servo circuit 25 is indicated on the recording start address of the n-th track TR in the recording target region, which is set in step S101, so that seek operation control is performed and also, the recording modulator 16 causes driving control of the SLM 4 based on recording data to be started, thereby starting a recording operation. At this time, of course, the rotation direction of the spindle motor 18 for the spindle servo circuit 24 is indicated in response to the recording direction set for the track n.

In the next step S105, waiting for the recording at the end address of the track n to be completed is performed. That is, waiting for the recording to the sector corresponding to the recording end address of the track n is performed.

Then, when recording at the recording end address of the track n is completed, in step S106, a recording stop process is performed. That is, driving control of the SLM 4 by the recording modulator 16 is halted.

In the subsequent step S107, it is determined whether or not n=N. When a negative result is obtained as being not n=N, the process proceeds to step S108, where the value of n is incremented (n+1) and thereafter, a track jump command is performed in step S109. That is, the recording operation in this case is performed from the tracks TR in the inner region to those in the outer region. Therefore, a track jump command to the adjacent tracks TR in an outer region is issued to the servo circuit 25.

Furthermore, in the subsequent step S110, a spindle reverse rotation command is performed. That is, instructions for the spindle servo circuit 24 are issued so that the spindle motor 18 is reversely rotated.

In the next step S111, the reach to the recording start address of the track n is awaited. When the recording start address of the track n is reached, as a recording restart process in step S112, the driving control of the SLM 4 based on the subsequent data that is left at the time of the previous recording stop (S106) is started by the recording modulator 16. After that, the process returns to the previous step S105 as shown in the figure.

As a result of the above steps S105 to S112 being repeated, data recording on each track TR in the recording target region is performed.

When an affirmative result is obtained as being n=N in step S107 above, the data recording process is completed in step S113 and thereafter, first, a postcure process targeting a predetermined region containing a region in which data has been recorded is performed in step S114. That is, as a region in which postcure is performed, with regard to the recording target region set in step S101 above, a region is set in which a predetermined extra region in the radial direction and in the circumferential direction are added. Then, control of the cure light source 13, the servo circuit 25, and the spindle servo circuit 24 is performed so that irradiation of cure light by targeting the region is performed. The content of the processing to be performed when implementing postcure is identical to the above case of precure except that the address value for each track TR indicated to the servo circuit 25 differs, and accordingly, descriptions thereof are omitted.

In the subsequent step S115, a management information recording process is performed.

That is, recording region management information indicating the correspondence between a series of data recorded by the recording operation completed in step S113 above and the recording region thereof (the recording target region set in step S101) is generated, and recording data based on this recording region management information is supplied to the recording modulator 16. Then, control of a seek operation to the predetermined management information recording area on the hologram recording medium HM is performed, so that the recording of the recording region management information is performed.

Although a description with reference to the figures is omitted, also when recording of the recording region management information is performed in this manner, precure for a recording target region and postcure for a predetermined region containing a recorded portion are performed. Since the processing content for implementing these cure processes is identical to each cure process described above except that the address information to be indicated to the servo circuit 25 differs, a description thereof is omitted.

Modification

An embodiment has thus been described. However, the present application should not be limited to the examples described thus far.

For example, various techniques for setting the recording target region of a series of data for the hologram recording medium HM are considered. As long as the region is a "region that extends over a plurality of tracks TR arranged in the radial direction and that is a portion in the direction in which the tracks TR are formed", another technique can be adopted.

Figure 9:
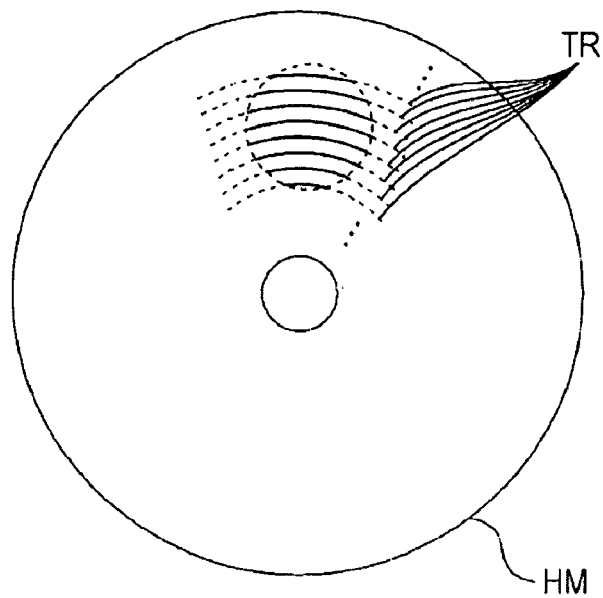
FIG. 9 illustrates a modification of the recording operation.

For example, as shown in FIG. 9, setting can also be performed in such a manner that the envelope of the data recording section of each track TR contained in the set recording target region becomes circular.

According to an embodiment, it is possible to maximize the recording density in the recording target region. The processing after the recording target region is set is identical to the processing of step S102 and subsequent steps of FIG. 8 above and accordingly, a repeated description thereof is omitted.

Figure 10:
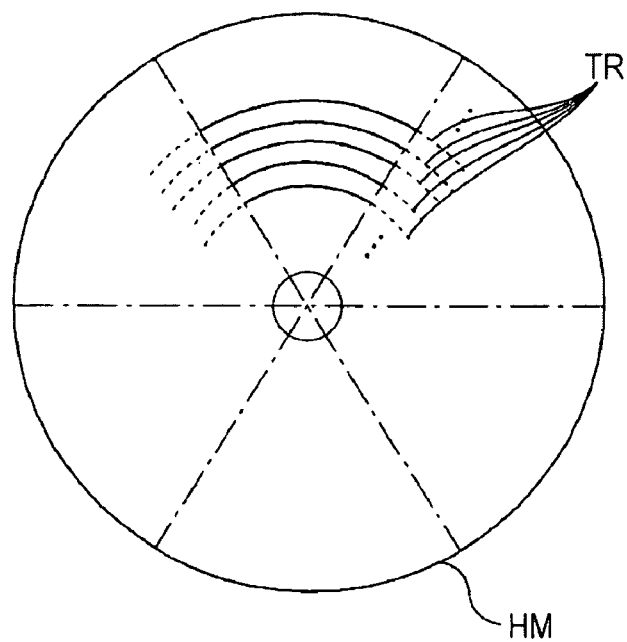
FIG. 10 illustrates another modification of the recording operation.

Alternatively, as shown in FIG. 10 below, a zone may be determined in advance on the hologram recording medium HM, and recording in each track TR by targeting each zone may also be performed.

As shown in the figure, a case is shown as an example in which each zone in this case is set in such a manner as to be divided for each predetermined rotation angle indicated by the short dashed line.

When performing recording, a necessary zone is selected from among these zones, and a predetermined position in the selected zone is determined to be a recording start position. After the recording start position has been determined in this manner, also, in this case, data is sequentially recorded in the boundary of zones on each track TR in accordance with the recording direction for each track TR, for example, from the tracks TR in the inner region to the tracks TR in the outer region.

If a zone is set in such a manner that each track TR is cut off for each necessary section and data is recorded in the boundary of zones on each track TR in that zone, data can be recorded in a "region that extends over a plurality of tracks TR arranged in the radial direction and that is a portion in the direction in which the tracks TR are formed".

Here, the setting of each zone is performed in such a manner that the boundary address for each zone on the track TR is stored in the controller 27. Therefore, in the controller 27 in this case, if the zone in which a series of data is recorded and the recording start position in the zone are determined, it is possible to determine the recording target region (the recording start address and the recording end address for each track TR) and the number N of tracks necessary for recording on the basis of the amount of the series of data.

Processing after the recording start address and the recording end address for each track TR and the number N of tracks necessary for recording are determined is identical to the processing of step S102 and subsequent steps shown in FIG. 8 above and, thus a repeated description thereof is omitted.

In the description up to this point, a case is shown as an example in which tracks TR are formed in a spiral shape. When the hologram recording medium HM is formed as a disc shape, tracks TR can be formed in a concentric circular shape, and the present application can also be suitably applied to that case.

When tracks TR are to be formed in a concentric circular shape, the configuration needs not be formed to drive the slide mechanism 19 on the basis of a sled error signal generated in response to lower frequencies of a tracking error signal.

Furthermore, the hologram recording medium HM may be another shape, such as, for example, a rectangular shape in addition to a disc shape.

For example, when the hologram recording medium HM is formed in a rectangular shape, in order that a plurality of tracks are arranged in a particular one plane direction, a plurality of tracks extending in a direction intersecting at right angles to the one plane direction may be formed.

That is, in this case, rather than performing recording by rotationally driving the hologram recording medium HM, recording along tracks is performed by moving the hologram recording medium HM in the direction in which the tracks are formed. In this case, the recording and reproduction apparatus is configured in such a manner that the spindle motor 18 is omitted, and the hologram recording medium HM can be displaced in two-axis directions of the track arrangement direction and the track formation direction by means of the slide mechanism 19 and the slide driving unit 20.

Here, also, in the case in which such a configuration is presupposed, as a result of a series of data being simply consecutively recorded along tracks as in the related art, the data recording section is formed comparatively long in the track formation direction, and a corresponding increase in the region in which additional recording is not possible occurs. Also, in this case, in order to reduce the region in which additional recording is not possible, a series of recording data should preferably be recorded on a plurality of tracks in such a manner that data recording sections of tracks overlap. That is, also, in this case, the recording target region of a series of data may be a "region that extends over a plurality of tracks arranged in the one plane direction and that is a portion in the direction in which the tracks are formed". As a result of the above, the region in which additional recording is not possible due to postcure can be reduced more than that in a case in which a technique of consecutively recording a series of data simply along tracks as in the related art is adopted, and thus the recording density can be improved.

Furthermore, for example, in the case that the hologram recording medium HM is formed in a rectangular shape and a plurality of tracks are formed in parallel in the manner described above, when zones are to be set as shown in FIG. 10 above, each zone may be set in such a manner that at least each track is cut off for each necessary section.

As a result of zones being set in the manner described above, it is possible to set the recording target region as a "region that extends over a plurality of tracks arranged in the one plane direction and that is a portion in the direction in which the tracks are formed".

Furthermore, in the description up to this point, a case is shown as an example in which the shape (shape of signal light) of a hologram page to be recorded is a circular shape. The shape of the signal light is not particularly limited, and the shape may be another shape, such as, for example, a rectangular shape.

Furthermore, although the signal light is arranged inside a predetermined region of the SLM 4 and the reference light is arranged outside the predetermined region of the SLM 4, the relationship of the arrangement may be reversed.

Furthermore, in the description up to this point, a case is shown as an example in which tracks are formed as a pit sequence. In addition, tracks can also be formed using a groove (furrow that is formed continuously). In this case, the address information and the clock information can be recorded on the basis of the information on a meandering period of a groove that is made to meander.

Alternatively, the groove can be made so as to have only a function of guiding the recording position of the hologram page without being made to meander, and a pit sequence used to separately record address information and clock information may also be formed in such a manner as to run side by side with the groove. In that case, an optical system is configured to include a plurality of photodetectors for irradiating second laser light so that at least two laser spots of a laser spot for detecting a tracking error signal for the groove and a laser spot for reading the information on the pit sequence are formed, and for separately detecting reflected light from the groove and the pit sequence.

Furthermore, in the description up to this point, although the recording direction is made to differ between adjacent tracks, the recording direction in each track may be in the same direction.

Furthermore, a case is shown as an example in which data recording to each track TR is sequentially performed in a predetermined direction, such as the recording is sequentially performed from the tracks in the inner region to the tracks in the outer region. As the recording technique of the present application, a series of data needs only be recorded by targeting a "region that extends over a plurality of tracks arranged in one plane direction (track arrangement direction) and that is a portion in the direction in which the tracks are formed", and the recording sequence of tracks in the region may be as desired.

Furthermore, in the above description, the recording region management information is recorded using hologram pages. The recording region management information can also be recorded by irradiation of the second laser light. More specifically, for example, a recordable area is formed in advance by applying a recording material using organic dye to a predetermined region on the reflection film 35 in FIG. 2, and the recording region management information is recorded by irradiating the second laser light using recording power to the recordable area.

Here, the recording region management information should be updated as appropriate each time data recording (that is, recording to the recording layer 32) using a hologram page is performed.

As a result of the above, when the recording region management information is to be recorded on the recording layer 32, there is a risk that the use efficiency of the recording layer 32 may be decreased when the necessity of performing postcure at each time of the recording is considered.

Accordingly, if a recordable area using the second laser light is provided as described above and recording region management information is recorded therein, a decrease in the use efficiency of the recording layer 32 in consequence of the additional recording of the management information can be prevented.

Furthermore, in the description up to this point, a case is shown as an example in which precure is performed to the recording target section of data before data recording is performed. For example, when a material by which sufficient recording efficiency is obtained even if activation by irradiation of cure light is not performed is selected as a recording material for the hologram recording medium, precure needs not to be performed.

Furthermore, as the cure light source, another light source other than an LED can be used.

Furthermore, in the description up to this point, a case is shown as an example in which a reflection-type space light modulator is used as a space light modulator, a transmissive-type space light modulator, such as, for example, a transmissive type liquid-crystal panel, can also be used.

Furthermore, in FIG. 1, a configuration (the slide mechanism 19 and the slide driving unit 20) for sliding the hologram recording medium side is shown as an example. In place of such a configuration, a sled mechanism and a sled driving unit for moving the optical head side may also be provided.

In that case, for example, the sled mechanism/sled driving unit may be configured in such a manner that the part surrounded using the dashed line in FIG. 1 is integrally sled-moved as the optical head.

Furthermore, in the description up to this point, the rotation control of the spindle motor 18 is performed by the rotation control of the spindle servo circuit 24 on the basis of a reproduction signal RF. Instead, the rotational speed of the spindle motor 18 may be detected by a rotary encoder, and the spindle servo circuit 24 may be configured to perform the rotation control of the spindle motor 18 on the basis of the result.

Furthermore, in the description up to this point, a case is shown as an example in which a focus coil and a tracking coil are provided and the two-axis driving of the objective lens 9 is implemented by electromagnetic driving. In addition, piezo-actuators for driving the objective lens 9 in a focus direction and in a tracking direction correspondingly may be provided so as to implement two-axis driving.

Furthermore, in the description up to this point, a case is shown as an example in which the present application is applied to the recording and reproduction apparatus capable of performing both recording and reproduction. Alternatively, the present application can be suitably applied to a recording-dedicated apparatus capable of performing only recording.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A recording apparatus for performing recording on a hologram recording medium on which data is recorded using a moire generated by interference between reference light and signal light, the hologram recording medium including: (a) a data recording layer on which data is recorded using a moiré; and (b) a position information recording layer having formed thereon tracks in which at least address information for indicating a physical position on the data recording layer is recorded, wherein a plurality of tracks on the position information recording layer are formed in such a manner as to be arranged in one plane direction of the hologram recording medium, the recording apparatus comprising:
 a processor;
 a first light source operatively coupled to the processor, the first light source being configured to output first laser light having a first wavelength;
 a second light source operatively coupled to the processor, the second light source being configured to output second laser light having a second wavelength differing from the first wavelength;
 a recorder operatively coupled to the processor; and
 a memory device storing instructions which when executed by the processor, cause the processor, in cooperation with the first light source, the second light source, the recorder and the memory device, to:
 (a) record units of hologram pages on the data recording layer of the hologram recording medium in such a manner that:
  (i) a recording data sequence is converted into a data pattern in units of hologram pages;
  (ii) the signal light is generated by performing space light modulation on the first laser light based on the data pattern;
  (iii) the reference light is generated based on the first laser light; and
  (iv) the signal light and the reference light are irradiated to the hologram recording medium;
 (b) irradiate the hologram recording medium with the second laser light in such a manner that the light axis of the second laser light matches the light axis of the irradiated first laser light;
 (c) detect reflected light from the position information recording layer;
 (d) based on a reflected light signal obtained by the detected reflected light perform position control so that a determined data recording position is on the track;
 (e) for each of a designated number of tracks arranged in the one plane direction, set a different data recording target section such that each length of the different data recording sections are equal, each different data recording target section extending over each of the designated number of tracks; and
 (f) perform control on the recorder in such a manner that a series of data to be recorded is recorded in a region that:
  (i) includes the set data recording target sections;
  (ii) extends over the designated number of tracks arranged in the one plane direction; and
  (iii) is a portion in the direction in which the designated number of tracks are formed on the hologram recording meduim.

2. The recording apparatus according to of claim 1, wherein the instructions when executed by the processor, cause the processor to control the recorder so that recording directions become opposite to each other between adjacent tracks in the region.

3. The recording apparatus of claim 2, wherein: the address information is recorded in such a manner that bit 0 or bit 1is represented by a difference in the ratio of an ON pulse to an OFF pulse; and the instructions, when executed by the processor, cause the processor to receive the reflected light signal; and detect the address information based on the result in which the difference in the ratio of the ON pulse to the OFF pulse is detected.

4. The recording apparatus of claim 1, wherein the instructions, when executed by the processor, cause the processor to, based on information on the amount of the series of data and a recording start position of the series of data, set the data recording target section of each track.

5. The recording apparatus of claim 1, wherein the instructions, when executed by the processor, cause the processor to, based on information on a recording start position of the series of data and the amount of the series of data, set the data recording target section of each track so that an envelope of a data recorded portion is formed so as to have a circular shape and thereby set a region in which the series of data is recorded.

6. The recording apparatus of claim 1, wherein: the hologram recording medium is divided into a plurality of zones formed in such a manner that the tracks are cut off for each necessary section, and in order to define the region of each zone, a zone boundary position indicating a division for each of the zones on the tracks is determined; and the instructions, when executed by the processor, cause the processor to perform control so that recording of the series of data is stopped/started for each zone boundary position of each track in the recording target zone for which data recording is performed.

7. The recording apparatus of claim 1, wherein the instructions, when executed by the processor, cause the processor to record, on the hologram recording medium, data management information indicating correspondence between a series of data recorded and a recording region of the series of data.

8. A recording method for performing recording on a hologram recording medium on which data is recorded using a moire generated by interference between reference light and signal light, the hologram recording medium including: (a) a data recording layer on which data is recorded using a moire; and (b) a position information recording layer having formed thereon tracks in which at least address information for indicating a physical position on the data recording layer is recorded, wherein a plurality of tracks on the position information recording layer are formed in such a manner as to be arranged in one plane direction of the hologram recording medium, the recording method comprising:
  (a) for each of a designated number of tracks arranged in the one plane direction, setting a different data recording target section such that each length of the different data recording sections are equal, each different data recording target section extending over each of the designated number of tracks;
  (b) performing data recording on the data recording layer in such a manner that a series of data is recorded in a region that:
    (i) includes the set data recording target sections;
    (ii) extends over the designated number of tracks arranged in the one plane direction; and
    (iii) is a portion in the direction in which the tracks are formed.

9. A recording apparatus for performing recording on a hologram recording medium on which data is recorded using a moire generated by interference between reference light and signal light, the hologram recording medium including: (a) a data recording layer on which data is recorded using a moire; and (b) a position information recording layer having formed thereon tracks in which at least address information for indicating a physical position on the data recording layer is recorded, wherein a plurality of tracks on the position information recording layer are formed in such a manner as to be arranged in one plane direction of the hologram recording medium, the recording apparatus comprising:
  a first light source configured to output first laser light having a first wavelength;
  a second light source configured to output second laser light having a second wavelength differing from the first wavelength;
  a recorder configured to perform data recording in units of hologram pages on the data recording layer of the hologram recording medium in such a manner that:
    (a) a recording data sequence is converted into a data pattern in units of hologram pages;
    (b) the signal light is generated by performing space light modulation on the first laser light based on the data pattern;
    (c) the reference light is generated based on the first laser light; and
    (d) the signal light and the reference light are irradiated to the hologram recording medium;
  a reflected light detector configured to:
    (a) irradiate the hologram recording medium with the second laser light in such a manner that the light axis of the second laser light matches the light axis of the first laser light irradiated by the recorder; and
    (b) detect reflected light from the position information recording layer;
  a position controller configured to, based on a reflected light signal obtained by reflected light detection by the reflected light detector, perform position control so that a data recording position determined by the recorder is on the track; and
  a recording controller configured to:
    (a) for each of a designated number of tracks arranged in the one plane direction, set a different data recording target section such that each length of the different data recording sections are equal, each different data recording target section extending over each of the designated number of tracks;
    (b) perform control on the recorder, in such a manner that a series of data to be recorded is recorded in a region that:
      (i) includes the set data recording target sections;
      (ii) extends over a plurality of tracks arranged in the one plane direction; and
      (iii) is a portion in the direction in which the tracks are formed.

* * * * *